United States Patent [19]
Costanza et al.

[11] 4,057,509
[45] Nov. 8, 1977

[54] POLYGALACTOMANNAN ALLYL ETHER GELS

[75] Inventors: John R. Costanza, North Plainfield; Ronald N. DeMartino, Wayne, both of N.J.; Arthur M. Goldstein, Plainview, N.Y.

[73] Assignee: Celanese Corporation, New York, N.Y.

[21] Appl. No.: 735,668

[22] Filed: Oct. 26, 1976

[51] Int. Cl.$^2$ ............................................. B01J 13/00
[52] U.S. Cl. .................................. 252/316; 149/19.7; 149/118; 252/8.55 C; 252/8.55 R; 536/114
[58] Field of Search .......................... 252/316, 8.55 C; 149/19.7, 118; 536/114

[56] References Cited
U.S. PATENT DOCUMENTS

| | | | |
|---|---|---|---|
| 2,599,771 | 6/1952 | Moe .................................. | 252/316 X |
| 3,007,879 | 11/1961 | Jordan ............................. | 536/114 X |
| 3,146,200 | 8/1964 | Goldstein et al. ............... | 536/114 X |
| 3,223,699 | 12/1965 | Schlageter ......................... | 536/114 |
| 3,326,890 | 6/1967 | Engelskirchen et al. ....... | 252/316 X |
| 3,912,713 | 10/1975 | Boonstra et al. ................ | 536/114 |

*Primary Examiner*—Richard D. Lovering

[57] ABSTRACT

This invention provides novel highly acidic gels of polygalactomannan allyl ether gum and sulfur dioxide. The gels exhibit dimensional stability, and are useful for oil well acidizing and borehole plugging, and for the preparation of explosive slurries.

6 Claims, No Drawings

POLYGALACTOMANNAN ALLYL ETHER GELS

BACKGROUND OF THE INVENTION

The polygalactomannans are polysaccharides composed principally of galactose and mannose units and are usually found in the endosperm of leguminous seeds, such as guar, locust bean, honey locust, flame tree, and the like. Guar flour, for example, is comosed mostly of a galactomannan which is essentially a straight chain mannan with single membered galactose branches. The mannose units are linked in a 1-4-$\beta$-glycosidic linkage and the galactose branching takes place by means of a 1–6 linkage on alternate mannose units. The ratio of galactose to mannose in the guar polymer is, therefore, one to two. Guar gum has a molecular weight of about 220,000.

Locust bean gum is also a polygalactomannan gum of similar molecular structure in which the ratio of galactose to mannose is one to four. Guar and locust bean gum are the preferred sources of the polygalactomannans, principally because of the commercial availability thereof.

Polygalactomannan gums swell readily in cold water and can be dissolved in hot water to yield solutions which characteristically have a high viscosity even at a concentration of 1–1.5 percent. Guar gum and locust bean gum as supplied commercially usually have a viscosity (at 1% concentration) of around 1000 to 4000 centipoises at 25° C using a Brookfield Viscometer Model LVF, spindle No. 2 at 6 rpm.

There are various rigorous applications that require greater stability under variable conditions than is provided by hydrocolloid gums that are commercially available. For example, it is desirable that a gum which functions as a protective colloid or gelling agent in oil well drilling mud compositions and oil well fracturing compositions exhibit a degree of solution stability and heat stability under operating conditions.

Further, solutions of ordinary hydrocolloid gums are not sufficiently stable under variable conditions of pH and temperature or not sufficiently stable in the presence of polyvalent metal ions to qualify for application as explosive gelling agents or as oil well acidizing media, and the like.

Accordingly, it is an object of this invention to provide high viscosity hydrocolloid gum compositions which exhibit solution stability and heat stability under conditions of low pH.

It is another object of this invention to provide highly acidic gels of polygalactomannan gums which are suitable as explosive gelling agents and as oil well acidizing media.

It is a further object of this invention to provide a novel process for producing dimensionally stable gels of polygalactomannan allyl ether gums.

Other objects and advantages shall become apparent from the following description and examples.

DESCRIPTION OF THE INVENTION

One or more objects of the present invention are accomplished by the provision of a process for preparing a gel of polygalactomannan allyl ether gum which comprises introducing sulfur dioxide into an aqueous solution of polygalactomannan allyl ether gum in sufficient quantity to increase the viscosity of the aqueous solution to gel formation.

Whenever the following description refers specifically to guar gum, it is understood that the disclosure is applicable to other closely related polygalactomannan gums in general, and locust bean gum in particular.

The term "allyl" as employed herein is meant to include radicals corresponding to chemical structure:

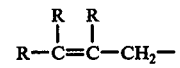

wherein R is selected from hydrogen and methyl groups (e.g., allyl, methallyl and crotyl radicals).

By the term "degree of substitution" as employed herein is meant the average substitution of ether groups per anhydro sugar unit in the polygalactomannan gums. In guar gum, the basic unit of the polymer consists of two mannose units with a glycosidic linkage and a galactose unit attached to a hydroxyl group of one of the mannose units. On the average, each of the anhydro sugar units contains three available hydroxyl sites. A degree of substitution of three would mean that all of the available hydroxy sites have been substituted with allyl ether groups.

PREPARATION OF ALLYL ETHERS OF POLYGALACTOMANNAN GUMS

The etherification processes as described herein are applicable to polygalactomannan gums in the form of finely divided powders or in the form of gum "splits".

Guar gum and other polygalactomannan hydrocolloids are derived from certain seeds of the plant family "leguminosae". The seeds are composed of a pair of tough, non-brittle endosperm sections referred to as "splits", between which is sandwiched a brittle embryo layer. The entire structure is enclosed in a tough seed coat.

The endosperm splits are extremely tough and non-brittle. This renders them difficult to reduce into a finely divided state. One method of separating the endosperm splits is described in U.S. Pat. No. 3,132,681. Methods of reducing endosperm splits into finely divided powder are described in U.S. Pat. No. 2,891,050; U.S. Pat. No. 3,455,899; and references cited therein.

In one embodiment of the present invention, allyl ethers of polygalactomannan such as guar gum or locust bean gum are prepared by contacting the solid gum with allyl halide and a stoichiometric excess of alkali metal hydroxide or ammonium hydroxide in a reaction medium comprising an aqueous solution of water-miscible solvent at a temperature between about 10° C and 100° C for a reaction period sufficient to achieve a degree of substitution by allyl ether groups between about 0.01 and 3.0.

The solid polygalactomannan gum which is etherified can be in the form of endosperm splits or in the form of finely divided powder which is derived from the endosperm splits. It is an important feature of the process that polygalactomannan gum being etherified with allyl groups remains as a solid phase in the reaction medium during the reaction period.

The allyl halide reactant in the etherification process is preferably employed in the form of either the 1-bromo or the 1-chloro substituted derivatives, such as for example, allyl chloride, allyl bromide, methallyl chloride, methallyl bromide, crotyl chloride, crotyl bromide, and the like. The quantity of allyl halide employed is determined by the degree of substitution which it is desirable to achieve. For example, the etherification of five parts by weight of guar gum with one part by weight of allyl chloride nominally yields guar gum ether having a 0.3 degree of substitution. A higher relative weight ratio of allyl halide reactant to galactomannan gum yields a higher degree of substitution. Generally, the preferred degree of substitution is in the range between about 0.05 and 2.5.

The etherification reaction between polygalactomannan gum and allyl halide reactant is conducted in the presence of a stoichiometric excess of alkali metal hydroxide or ammonium hydroxide. The alkali metal or ammonium hydroxide performs both as a reactant and as a catalyst. The hydroxide and the polygalactomannan gum interact to form an alkoxide derivative. The alkoxide derivative so formed then in turn reacts with allyl halide, thereby introducing allyl ether substituents into the polygalactomannan gum. This latter etherification reaction is catalyzed by the presence of excess alkali metal or ammonium hydroxide. This excess of hydroxide component which functions as a catalyst can vary in quantity between about 0.5 and 20 weight percent, based on the weight of polygalactomannan gum utilized. This excess of hydroxide corresponds to the quantity not consumed in the etherification reaction.

The etherification process preferably is conducted in a two phase reaction system comprising an aqueous solution of a water-miscible solvent and water-soluble reactants in contact with solid polygalactomannan gum. The water content of the water-miscible solvent can vary in quantity between about 10 and 60 weight percent, depending on the particular solvent of choice. If more than an optimum quantity of water is present in the reaction system, then the polygalactomannan gum may swell or enter into solution, thereby complicating product recovery and purification.

The water-miscible solvent is introduced into the reaction system in an amount sufficient for the preparation of a dispersion of polygalactomannan gum which can be agitated and pumped. The weight ratio of water-miscible solvent to polygalactomannan gum can vary in the range between about 1 and 10 to 1, and preferably in the range between about 1.5 and 5 to 1.

Suitable water-miscible solvents for suspension of polygalactomannan gum in the allyl etherification process include alkanols, glycols, cyclic and acyclic alkyl ethers, alkanones, dialkylformamide, and the like, and mixtures thereof. Illustrative of suitable water-miscible solvents are methanol, ethanol, isopropanol, secondary butanol, secondary pentanol, ethyleneglycol, acetone, methylethylketone, diethylketone, tetrahydrofuran, dioxane and dimethylformamide.

The process for allyl etherification of polygalactomannan gum is conducted at a temperature in the range between about 10° C and 100° C and preferably in the range between about 20° C and 60° C. For convenience, the process can be conducted at ambient temperature. At the lower temperatures the reaction rate is slower, and at the higher temperatures the reaction is faster but the formation of by-products is increased. The reaction time can be varied in the range between about 1 and 12 hours, and preferably in the range between about 4 and 8 hours.

After the completion of the allyl etherification reaction, the solid polygalactomannan allyl ether product is separated from the fluid reaction medium by centrifugation or filtration. The solid product so recovered is preferably further treated and purified by washing with the same water-miscible solvent as previously employed in the process, and then by further washing with a more anhydrous form of the same solvent.

PREPARATION OF POLYGALACTOMANNAN ALLYL ETHER GELS

In a preferred embodiment, a gel of a polygalactomannan allyl ether gum such as guar allyl ether gum is dissolved in water, and sulfur dioxide is introduced into the aqueous solution in the form of a gaseous stream or as a dilute aqueous solution.

The polygalactomannan allyl ether gum concentration in the aqueous solution can vary in the range between about 0.25 and 5 weight percent, and preferably in the range between about 0.5 and 2 weight percent. A 1% solution of polygalactomannan allyl ether gum is excellent for the purposes of gel preparation in accordance with the present invention.

Introduction of sulfur dioxide into the gel-forming aqueous medium can also be accomplished by the use of compounds which generate sulfur dioxide in situ, e.g., sodium bisulfite.

The quantity of sulfur dioxide retained in a polygalactomannan allyl ether gel composition normally will vary in the range between about 0.05 and 2 weight percent based on the total weight of the gel composition.

It is believed that the sulfur dioxide is contained in the 3-dimensional gel structure both as physically and chemically bonded crosslinking moieties.

The pH of the polygalactomannan allyl ether gum compositions usually is below about 3.0 because of the presence of sulfurous acid, e.g., a pH of about 1.5.

The present invention polygalactomannan allyl ether gel compositions are characterized by high strength and exceptional stability under conditions of high acidity. The gel compositions are suitable for preparation of explosive slurries. They are also useful for borehole plugging and particularly for oil well acidizing. In the applications recited, the components of the gel composition are admixed, and the solidification of the gel-forming solution can be controlled to occur within several minutes or within several hours as desired.

The following examples are further illustrative of the present invention. The reactants and other specific ingredients are presented as being typical, and various modifications can be derived in view of the foregoing disclosure within the scope of the invention.

EXAMPLE I

Purification Of Guar Gum

Guar gum is extracted with methanol to remove methanol-soluble oils. The guar gum so treated is wetted with isopropanol, then sufficient water is added slowly to form a 0.5% solution. After standing overnight, the solution is centrifuged at 8000 rpm for 30 minutes. The clear supernatant is decanted from the insoluble residue and filtered through glass fiber filter paper.

The filtrate solution is diluted with ethanol to precipitate the guar gum. The precipitate is filtered, dried, and ground in a Wiley mill through a 40 mesh screen.

The purified guar gum powder has less than 0.1% nitrogen content, and about 0.48% ash content. For the purposes of the present invention, the polygalactomannan allyl ether can be prepared from either the purified or unpurified guar gum.

EXAMPLE II

Preparation Of Polygalactomannan Allyl Ethers

| Formulation reference | A | A' | B | B' |
|---|---|---|---|---|
| 50% Isopropanol | 1800 mls | 1800 | 1800 mls | 1800 |
| Guar gum | 300 grams | 300 | — | — |
| Locust bean gum | — | — | 300 grams | 300 |
| 50% Sodium hydroxide | 120 grams | 240 | 120 grams | 240 |
| Allyl chloride | 60 grams | 120 | 60 grams | 120 |

The polygalactomannan gum is slurried in the isopropanol solution, then heated to 50° C and purged for one hour with nitrogen. The caustic solution is added to the slurry, and the mixture is stirred for ten minutes.

The allyl chloride reactant is added to the mixture, and the etherification reaction is conducted at 50° C over a period of eight hours. The reaction mixture is neutralized to a pH of 7 with acetic acid, then filtered, washed twice with 50% isopropanol and once with 100% isopropanol. The polygalactomannan ether product is recovered and air-dried.

The higher the degree of substitution of allyl ether groups in the polygalactomannan ether derivatives, the greater the stability under varying conditions of pH and temperature. The polygalactomannan ether derivatives of the present invention have the further advantages of improved solution stability and resistance to bacterial degradation.

A guar gum ether derivative produced in accordance with Formulation A hereinabove has a degree of substitution of 0.2. A 1% solution of this ether derivative, after standing at 25° C for 19 hours, has a viscosity of 3000 CPS.

A guar gum ether produced in accordance with Formulation A' hereinabove has a degree of substitution of 0.4. A 1% aqueous solution of this ether derivative, after standing at 25° C for 19 hours, has a viscosity of 900–1000 CPS.

A guar gum ether having a degree of substitution above about 1.0 is essentially water insoluble at temperatures below about 100° C.

EXAMPLE III

Polygalactomannan Allyl Ether Gels

This example illustrates the preparation of polygalactomannan allyl ether gels by treatment with sulfur dioxide.

Gaseous sulfur dioxide is bubbled into solutions of guar allyl ether gum (D.S. of 0.2) for specific time periods. The solution viscosity increase proceeds as follows:

| 1% Solution, CPS | 2950 | 2950 | 2950 | 2950 |
|---|---|---|---|---|
| SO₂ addition period, minutes | 1 | 2.5 | 5 | 10 |
| pH (after SO₂ addition) | 1.9 | 1.6 | 1.4 | 1.3 |
| CPS, 0.5 hour | 2950 | 2900 | 3000 | 6000 |
| 1 hour | 3000 | 3050 | 3250 | Med. Gel |
| 2 hours | 3050 | 3150 | 6500 | " |
| 4 hours | 3100 | 3300 | Med. Gel | Hard Gel |
| 1 day | 3300 | Soft Gel | " | " |
| 2 days | 3700 | " | Hard Gel | " |
| 3 days | 4500 | Med. Gel | " | " |
| 7 days | Soft Gel | " | " | " |
| 20 days | " | " | " | " |

When a 1% aqueous solution of sulfur dioxide is added to a 1% solution of guar allyl ether gum (D.S. of 0.2), a soft gel forms within 2 days. Similar results are obtained with locust bean allyl ether gum.

EXAMPLE IV

This example illustrates the use of sodium bisulfite as a source of sulfur dioxide for the treatment of guar allyl ether gum.

A 1% solution of guar allyl ether gum (D.S. of 0.2) is prepared. To the solution is added sodium bisulfite in a calculated quantity to form a final solution concentration of 2% sodium bisulfite.

| Time | CPS |
|---|---|
| 0 | 3050 |
| 1 hour | 3250 |
| 1 day | 3400 |
| 2 days | 4300 |

What is claimed is:

1. A gel composition consisting essentially of water, between about 0.05 and 2 weight percent sulfur dioxide, and between about 0.25 and 5 weight percent polygalactomannan allyl ether gum having a degree of substitution between about 0.01 and 3.0.

2. A gel composition in accordance with claim 1 wherein the polygalactomannan allyl ether gum is guar allyl ether gum.

3. A gel composition in accordance with claim 1 wherein the polygalactomannan allyl ether gum is locust bean allyl ether gum.

4. A gel composition in accordance with claim 1 wherein the pH of the composition is below about 3.

5. A process for preparing a gel of polygalactomannan allyl ether gum which comprises introducing sulfur dioxide into an aqueous solution of between about 0.25 and 5 weight percent polygalactomannan allyl ether gum having a degree of substitution between about 0.01 and 3.0 in sufficient quantity to increase the viscosity of the aqueous solution to gel formation.

6. A process in accordance with claim 5 wherein the sulfur dioxide is introduced into the aqueous solution as a gaseous stream.

* * * * *